United States Patent Office 3,666,581
Patented May 30, 1972

---

3,666,581
METHOD OF MAKING DRIED GYPSUM ARTICLES HAVING IMPROVED STRENGTH TO DENSITY RATIO
Marvin K. Lane, Chicago, Ill., assignor to United States Gypsum Company, Chicago, Ill.
No Drawing. Filed Apr. 1, 1969, Ser. No. 812,330
Int. Cl. B32b *13/00*
U.S. Cl. 156—39                                3 Claims

---

ABSTRACT OF THE DISCLOSURE

The process of making dried gypsum articles having an increased strength to density ratio and which can be cast from an aqueous slurry of calcined gypsum that contains less water for the same fluidity, by providing a specially sized calcined gypsum which contains 0% to 7% by weight of particles larger than 32 microns and 0% to 8% by weight of particles smaller than 1 micron, forming a slurry at usable fluidity after mixing vigorously with accelerator and casting while the sized calcined gypsum has a combined moisture content of less than 9% by weight.

---

This invention relates to cast gypsum products and to a process for increasing their strength without increasing their dry density by using a specially sized calcined gypsum. Since this specially sized, calcined gypsum gives a more fluid slurry in water on vigorous mixing, this invention also embodies reducing the amount of water used in the slurry for casting when foam is employed in conjunction with water to maintain a constant dry density in the set cast, thereby reducing drying costs.

More particularly, this invention relates to a process of producing gypsum plasterboard, lith, partition tile, roof plank, floor tile and job-mixed concretes, such as poured roof recks, having increased dry compressive strength at any particular density, thus making it possible to reduce the amount of calcined gypsum and other materials used in producing cast gypsum products while maintaining the dry compressive strengths normally attainable at the higher densities. In this respect, objects of this invention are similar to those of my U.S. Pat. No. 3,359,146 which discloses a process for making gypsum casts having an increased strength to density ratio by providing a calcined gypsum in the form of fine particles which disintegrate upon mixing with water, forming a slurry and mixing until the gypsum particles disintegrate, adding accelerator, and casting while the gypsum has a combined moisture content of less than 9% by weight. However, the subject invention has the additional advantage of obtaining the improved strength to density ratio using less water and more foam in the slurry of specially sized calcined gypsum used for the casting because less water is needed to maintain the same fluidity.

The process of this invention is particularly well suited for the manufacture of paper-covered gypsum plasterboard, wallboard and the like, although it is not limited thereto.

The manufacture of cast gypsum articles is well known in the art, and it is generally recognized as desirable to produce a light weight product, providing this can be accomplished with no sacrifice in strength and by a process adaptable to operation on modern, high speed machinery. The lighter weight products consume a smaller quantity of materials, cost less to distribute and contribute to more satisfactory performance on the job through easier handling, etc.

In addition, if lighter weight products can be made from a slurry of specially sized calcined gypsum, water and foam that needs less water for the same fluidity, then products can be produced faster, more economically, and at lower kiln drying costs. Excess water causes a heavy slurry and is very costly to dry by evaporation in kilns.

In the commercial manufacture of paper-covered gypsum board, a calcined gypsum slurry is prepared, the ingredients being added to a mixer and after a few seconds deposited onto a paper liner moving under the mixer. In a typical installation, the ground calcined gypsum is added to the mixer along with gauging water. Other ingredients added may include an accelerator such as freshly ground cast gypsum block, potassium sulphate etc., a cereal grain binding agent and cellulose fiber reinforcing material. There may also be added a premixed tenacious foam to reduce the density of the slurry and the gypsum board made from it. A cover sheet is added, the board is shaped to proper dimensions and passed into the drying kiln about 10 to 15 minutes after the gypsum core was cast. To achieve maximum strength in the core, setting or hydration must be completed before the board enters the kiln. It is equally important, however, that the paper liners be in place and the board shaped to its final dimensions before any appreciable amount of hydration has taken place.

Paper-covered gypsum wallboard currently being marketed in a ½" thickness weighs between 1850 and 2150 pounds per thousand square feet. At the low end of this range, the gypsum core has a density of about 44 pounds per cubic foot, and a compressive strength of about 550 pounds per square inch. However desirable it might be to produce a lighter weight board, a reduction in density by a prior art process has always been accompanied by an undesirable reduction in strength.

It is an object of this invention, therefore, to provide a process for achieving a lower density set gypsum plaster article without any sacrifice in compressive strength. It is another object of this invention to provide increased dry compressive strength in set gypsum plaster without any increase in the dry density of said set gypsum.

A further object of this invention is to provide a process for the manufacture of a set gypsum plaster article having an enhanced strength-density relationship.

A still further object of this invention is to provide a process for achieving a lower density plasterboard without any sacrifice in compressive strength.

It is another object of this invention to provide increased dry compressive strength of the set gypsum core of a plasterboard without any increase in the dry density of that core.

A further object of this invention is to provide a process for manufacturing light weight gypsum articles from calcined gypsum which utilizes a greater proportion of the strength potentially available in the gypsum crystal.

A further object of this invention is to provide a process for the manufacture of a light weight gypsum article from calcined gypsum by means of which a greater percentage of the strength of the gypsum crystal contributes effectively to the strength of said light weight article.

Another object of this invention is to provide a process for the production of cast gypsum articles with an improved strength to density ratio which is adaptable to existing machinery.

A further object is to provide cast gypsum articles with an improved compressive strength to density ratio.

It is a further object of this invention to do all the above with a slurry that contains less water and more foam at the same fluidity. It is in this respect that this invention differs from that of U.S. Pat. No. 3,359,146. The use of less water in the slurry enables faster wallboard production and allows lower kiln drying temperature than heretofore possible, thereby reducing edge and end burning of the wallboard in the kiln during drying. The slurry, itself, which flows between the paper on the wallboard machine is lighter because it contains more foam and less water.

In U.S. Pat. No. 3,359,146 it was disclosed that hemihydrate particles "disperse" or distintegrate when they are stirred vigorously in water prior to casting. The details of this disintegration phenomenon are described in U.S. Pat. No. 3,359,146. They are also described in a paper published in the March 1968 and April 1968 issues of Rock Products entitled, "The Disintegration of Plaster Particles in Water."

In U.S. Pat. No. 3,359,146 it is stated that the extremely fine fragments of hemihydrate that result from the disintegration of the larger particles develop higher strength during set at the same density. Therefore, the more distintegration that is achieved in the mixer the higher the strength of the set cast. However, these fine fragments, mostly below 1 micron in size, also influence the amount of water needed in the mixer. A larger amount of fine fragments increases the amount of water needed to maintain a slurry that is sufficiently fluid to flow properly from the board slurry mixer to be deposited onto a paper liner moving under the mixer.

Further studies on the strength developing ability of the different size ranges of particles in hemihydrate have revealed that, aside from the very fine fragments that develop from the very large disintegrable particles in the slurry mixer, there is another size range, between about 6 microns and 16 microns, that gives excellent strength in set casts, even better than the very fine fragments. Studies also revealed that the larger, plus 32 micron particles that do not disintegrate in the slurry mixer give very poor strength development in the set casts.

Therefore, any dry sizing technique that promotes this middle size range of particles that are difficult to disintegrate and removes the much larger particles that are easy to disintegrate will give higher strengths than techniques previously disclosed in U.S. Pat. No. 3,359,-146, with the additional excellent feature of allowing the use of less water in the slurry mixer.

The following experiments will show how the objects of this invention can be accomplished. In the discussions and data for these experiments hemihydrate particles are grouped into three critical size ranges: smaller than 1 micron, between 6 microns and 16 microns, and larger than 32 microns. The fineness of the original dry hemihydrate and of the same hemihydrate after exposure to vigorous mixing in water prior to casting will both be considered. During the mixing, there is always a loss of plus 32 micron disintegrable particles and a gain of minus 1 micron fragments due to particle disintegration in the mixer, if disintegrable plaster is used.

EXAMPLE 1

A disintegrable fresh kettle hemihydrate was prepared by calcining 50 lbs. of gypsum rock (Southard landplaster) in a kettle at 250° F. for 1½ hours. The resulting hemihydrate was subjected to successively more severe dry impact grinding in a small pilot hammermill by changing the screen size. This gave a series of samples of the hemihydrate having different degrees of fineness from quite coarse to extremely fine in the dry state. All the samples contained a rather wide distribution of sizes. However, as the degree of grinding was increased, the quantity of larger, disintegrable plus 32 micron particles was gradually reduced; the quantity of particles in the middle size range (about 6 microns to 16 microns) was first increased, then decreased with further extensive grinding; the quantity of ultrafine material (minus 1 micron) was gradually increased throughout.

Laboratory-board-slurry mixes were made for the entire series of samples and cubes were cast according to the following procedure. About 1500 cc. of gauging water was placed in a 12 quart mixing bowl, the exact amount being determined empirically to give the proper consistency to the slurry. The mixer employed was a Hobart Model A-200 equipped with a wire whip agitator.

Just prior to starting the agitator, 20 grams of ground gypsum block accelerator, 1600 grams of calcined rock, 21.6 grams of paper fiber reinforcing agent, 10.8 grams of a starch binder, and 2.3 grams of a dispersing agent or consistency reducer, such as Orzan "A" were added. Orzan "A" is an ammonium lignosulfonate, containing wood sugars, and is manufactured by Crown Zellerbach Corporation. The mixer was turned on at 365 r.p.m., and after five seconds, about 650 cc. of foam with a density of 13 pounds per cubic foot were added and the mixing continued for a total of 20 seconds. Five test cubes were cast and as soon as they had set, they were taken from the molds and placed in a kiln at 350° F. where they were dried to 70% of their wet weight. Drying was then completed at 110° F. and the compressive strength and density measured in the usual manner. The average of the five cubes was reported as the result of the run.

At the time the cubes were cast about one part of slurry was added to two parts of reagent grade isopropyl alcohol, with rapid stirring, so that the isopropyl alcohol interrupted the hydration. The particles were largely the hemihydrate and were filtered off, washed with isopropanol and dried at 110° F. The cellulose fiber in the dry product was removed by brushing through a No. 50 sieve and the dried and sieved powder was analyzed by a standard procedure for combined moisture (ASTM Method C-471) and the surface area, and therefore particle size, was determined by the Blaine air permeability apparatus which is described in ASTM Method C-204.

On all runs the temperature rise set time was maintained constant at 12 minutes by adjusting the ground block accelerator usage. Also, the fluidity of the slurry prior to casting was maintained constant at typical board-slurry fluidity and the density of the dry hydrated casts was maintained constant at about 43 lbs. per cubic foot, by adjusting the gauging water and tenacious foam.

Data obtained for these runs are shown in Table 1.

These data show that as the grinding became more severe, the dry set cast strength increased and then decreased, the maximum strength coinciding with the maximum quantity of 6 micron to 16 micron particles in the hemihydrate after slurry mixing. Also, the amount of particles in this middle range was about the same before and after slurry mixing, showing that these particles remain quite intact in the mixer.

The amount of minus 1 micron material in the dry hemihydrate was increased by successively finer grinding. However, since the hemihydrate disintegrates in the slurry mixer, the amount of minus 1 micron material after slurry mixing did not change very much with grinding because it consisted of the sum of the particles made in the dry grinder and the fragments made in the wet slurrf mixer. There is a tendency for this minus 1 micron total (after mixing) to go through a slight minimum as plus 32 micron disintegrable particles are broken down by the grinder.

The water-stucco ratio correlates with the minus 1 micron total after slurry miring because this is the material that contributes most of the surface area for wetting.

These data point out that the dry grinder does not break plus 32 micron particles in the same manner as they disintegrate in water. Distintegration is a much more definite cross-transfer from plus 32 microns to minus 1 microns, with the middle size range staying rather intact. The grinder, however, at first breaks plus 32 micron particles into the middle size range, as well as the minus 1 micron range.

These experiments were repeated many times and always the maximum strength was achieved when the slurry after mixing contained the largest amount of particles in the 6 micron to 16 micron range. This points out that this size range is very favorable for good strength development.

TABLE 1.—THE EFFECT OF HAMMERMILL GRINDING ON A DISINTEGRABLE KETTLE HEMIHYDRATE

|  | Particles between 5.7 microns and 16 microns, wt. percent | | Dry compressive strength at 43 lb./cu. ft., p.s.i. | Particles smaller than 1 micron, wt. percent | | Foamed board slurry water stucco ratio required for a board-slurry cast fluidity |
| --- | --- | --- | --- | --- | --- | --- |
|  | Dry | After board slurry mixing |  | Dry | After board slurry mixing |  |
| Hot pit kettle stucco prior to grinding | 24 | 25 | 700 | 2 | 13 | 0.91 |
| Grind 1 | 30 | 30 | 760 | 5.5 | 10 | 0.89 |
| Grind 2 | 38 | 38 | 785 | 8 | 10 | 0.89 |
| Grind 3 | 32 | 36 | 770 | 13 | 14 | 0.92 |
| Grind 4 | 25 | 25 | 700 | 22 | 20 | 0.96 |

EXAMPLE 2

In order to gain a better understanding of this material in the middle size range, a calcined gypsum hemihydrate was prepared in the kettle using very heavy aridization (3 lb. of calcium chloride per ton of gypsum) to give a hemihydrate which was essentially not disintegrable in water after mixing. This hemihydrate was ground mildly and air-separated into a series of narrowly graded size fractions with an air-classifier. These different size fractions were tested for strength development using the bench board slurry test procedure. Data obtained are shown in Table 2.

These data again point out that the middle size range produces the highest dry cast strength at 43 lb. per cu. ft. The water-stucco ratio correlates with the amount of minus 1 micron particles. The large (plus 32 micron) particles, if they do not disintegrate in the slurry mixer, develop very poor dry cast strength.

EXAMPLE 3

Fresh gypsum hemihydrate produced as in Example 1, was air-classified to remove all the very disintegrable particles larger than 32 microns. Bench board slurry tests were made with the minus 32 micron fine cut and results were compared to those for typically sized kettle hemihydrate that contains about 34% by weight of particles larger than 32 microns. Results of these tests are shown in Table 3.

The minus 32 micron fine cut of hemihydrate gave a much higher dry set cast compressive strength. Also, at the same time, this fine cut required a much lower water-stucco ratio for a board slurry casting fluidity.

The dry set strength of the cast was higher because of the presence of a much larger quantity of 6 micron to 16 micron particles in the slurry after mixing prior to casting.

The water-stucco ratio was lower because there were no plus 32 micron particles available to disintegrate during the slurry mixing operation; as a consequence there were less minus 1 micron particles present in the slurry after mixing prior to casting.

EXAMPLE 4

As an additional experiment, a kettle hemihydrate produced as in Example 1 was ground mildly in an impact grinder (as is conventional practice). This reground hemihydrate was tested using the bench board slurry mixing procedure. Results are shown in Table 4.

This regrinding raised the strength by increasing the quantity of particles in the middle size range. However, it did not raise it as much as size-classifying at 32 microns because it did not increase the middle size range as much as size-classifying. Regrinding did not reduce the water-stucco ratio significantly because there was still a rather large quantity of plus 32 micron particles left and available for disintegration in the slurry to minus 1 micron fragments and minus 1 micron particles were also made in the grinder.

EXAMPLE 5

In order to determine if size-classifying at 32 microns was equally as effective on ground gypsum rock prior to open kettle calcination as it was on gypsum hemihydrate after calcination, ground gypsum rock was also classified to give a fine cut free of plus 32 micron particles. This specially sized ground gypsum was then calcined in an TABLE 2.—THE EFFECT OF AIR-SEPARATING UNDISINTEGRABLE KETTLE HEMIHYDRATE INTO A SERIES OF NARROWLY SIZED CUTS WITH AN AIR-CLASSIFIER

|  | Mean particle size, microns | | Particles between 5.7 microns and 16 microns, wt. percent | | Dry compressive strength at 43 lb./cu. ft., p.s.i. | Particles smaller than 1 micron, wt. percent | | Foamed board-slurry water-stucco ratio required for a board-slurry casting fluidity |
| --- | --- | --- | --- | --- | --- | --- | --- | --- |
|  | Dry | After board slurry mixing | Dry | After board slurry mixing |  | Dry | After board slurry mixing |  |
| Cut 1 | 30 | 30 | 7 | 7 | 548 | 2 | 2 | 0.77 |
| Cut 2 | 19 | 19 | 34 | 34 | 800 | 2 | 2 | 0.79 |
| Cut 3 | 11 | 11 | 71 | 71 | 880 | 3 | 3 | 0.81 |
| Cut 4 | 6 | 6 | 70 | 70 | 855 | 5 | 5 | 0.87 |
| Cut 5 | 3 | 3 | 40 | 40 | 775 | 10 | 10 | 0.97 |

TABLE 3.—THE EFFECT OF SIZING TYPICAL DISINTEGRABLE KETTLE HEMIHYDRATE USED IN BOARD STUCCO AT 32 MICRONS

|  | Particles between 5.7 microns and 16 microns, wt. percent | | Dry compressive strength at 43 lb./cu. ft., p.s.i. | Particles smaller than 1 micron wt. percent | | Foamed board-slurry water-stucco ratio required for a board-slurry casting fluidity |
| --- | --- | --- | --- | --- | --- | --- |
|  | Dry | After board slurry mixing |  | Dry | After board slurry mixing |  |
| Normal grind containing 34% by weight of particles larger than 32 microns | 25 | 26 | 730 | 1 | 14 | 0.88-0.90 |
| After air-classification, wherein all the particles larger than 32 microns were removed (those that disintegrate easily during mixing in water) | 51 | 48 | 905 | 2 | 4 | 0.78 | open kettle and, at the same time, typically sized ground gypsum was calcined in a like manner in the same open kettle.

measurements were made on two of the very narrowly distributed cuts of calcined gypsum hemihydrate described in Example 2 above. Cuts 1 and 3 were chosen TABLE 4.—THE EFFECT OF RAPID MILD REGRINDING ON DISINTEGRABLE OPEN KETTLE HEMIHYDRATE USED IN BOARD STUCCO

|  | Particles between 5.7 microns and 16 microns, wt. percent | | Dry compressive strength at 43 lb./cu. ft., p.s.i. | Particles smaller than 1 micron wt. percent | | Foamed board-slurry water-stucco ratio required for a board-slurry casting fluidity |
| --- | --- | --- | --- | --- | --- | --- |
|  | Dry | After board slurry mixing |  | Dry | After board slurry mixing |  |
| Typical before regrind containing 34% by weight of particles larger than 32 microns | 25 | 26 | 730 | 1 | 14 | 0.88–0.90 |
| Typical after regrind still containing 7% by weight of particles larger than 32 microns | 38 | 35 | 850 | 8 | 13 | 0.87 |

Side-by-side laboratory board-slurry tests were made on both freshly calcined gypsum hemihydrates, typically sized with 35% larger than 32 microns and specially sized with 0% larger than 32 microns. Results of these tests are shown in Table 5.

These data show that air-classifying to remove plus 32 micron particles is equally effective when performed on ground gypsum rock prior to calcining as when performed on gypsum hemihydrate after calcination.

In the experimental examples described above, board-slurry fluidity was measured as follows. A standard board-slurry laboratory run was made as described in Example 1. Immediately following the 20 second stirring period, the slurry is poured into a standard ASTM consistometer used for measuring the fluidity of gypsum concrete slurries, ASTM Designation C472-61. The consistometer is filled to within 2 inches vertically from the top rim. Then, at exactly 45 seconds after the hemihydrate was first charged to the water in the mixer, the gate on the base of the consistometer is quickly opened and the slurry is allowed to flow out onto a glass plate. A patty diameter of 11 inches is defined as standard board-slurry fluidity.

In the experimental examples described above, the middle size range of particles (between 6 microns and 16 microns) have greater crystalline integrity than the larger particles (over 32 microns in size), because they disintegrate very slightly in water. Data in the examples also point out that these particles produce a set gypsum cast having a very high compressive strength. Under a microscope, these middle size range particles appear smoother and much less striated and fissured than the plus 32 micron particles. One method to measure the extent of this fissuring, or surface irregularities, in a particle is to compare surface area measurements made by the B.E.T. method to surface area measurements made by the Blaine art-permeability method. The B.E.T. gives all the surface, including all the little irregularities in the fissures. The Blaine gives the surface of an external envelope, or enclosure, around the particle. The closer the two surface area measurements on a particular narrowly distributed sample of particles, the less surface irregularities or fissuring exist on a particle in proportion to its size. These because they represent the lowest and highest compressive strengths. Results are as follows:

|  | Cut 1 | Cut 3 |
| --- | --- | --- |
| Mean particle size, microns | 29 | 12 |
| Specific Blaine S.A., sq. cm./g | 2,000 | 6,000 |
| Specific B.E.T. S.A., sq. cm./g | 33,000 | 36,000 |
| Surface in particle caused by fissuring, percent | 97 | 83 |

These data show that particles in the middle size range have much less fissuring in proportion to size than the larger ones, and this is considered to be the basic cause for the much improved strength developing ability of the middle size range of particles.

Application of this very useful effect of sizing calcined gypsum hemihydrate so that it is essentially free of plus 32 micron particles, requires that the calcined gypsum hemihydrate be of the disintegrable type. This subject invention, therefore, applies to all those calcined gypsum hemihydrates that are made in an open atmospheric calcining device. This includes open kettles, rotary calciners, indirectly heated conveyors, air swept direct heated mills, fluid bed calciners, etc.

Based on the above-described test results, the process of the invention when applied to the production of gypsum board is as follows: A source of gypsum having a particle size that is essentially no larger than 32 microns is provided by size classifying the gypsum by any suitable means, such as by an air classifier. An aqueous slurry of the calcined gypsum is made by mixing it with water. A TABLE 5.—THE EFFECT OF AIR CLASSIFYING THE GROUND GYPSUM ROCK AT 32 MICRONS AND THEN CALCINING IN AN OPEN KETTLE

|  | Particles between 5.7 microns and 16 microns, wt. percent | | Dry compressive strength at 43 lb./cu. ft., p.s.i. | Particles smaller than 1 micron wt. percent | | Foamed board-slurry water-stucco ratio required for a board-slurry casting fluidity |
| --- | --- | --- | --- | --- | --- | --- |
|  | Dry | After board slurry mixing |  | Dry | After board slurry mixing |  |
| Kettle calcined gypsum hemihydrate made from typical grind gypsum rock that contains about 35% by weight of particles larger than 32 microns | 22 | 25 | 680 | 1 | 15 | 0.90 |
| Kettle calcined gypsum hemihydrate made from air classified gypsum rock that contains 0% by weight of particles larger than 32 microns | 58 | 53 | 830 | 0.5 | 3 | 0.80 | conventional tenacious foam is added to the slurry, which is cast between paper cover sheets, and permitted to set and dry. The resulting board has increased dry compressive strength for a given density, compared to conventional board of the same weight. It will be readily apparent that the increased strength provided by this invention will either permit a board to be made with conventional densities, thus achieving these strengths, or a much lighter weight board to be made up which will still have the lower, more conventional strengths available to it.

The fineness test method used for determining the weight percent of particles in the calcined gypsum hemihydrate larger than 32 microns is as follows: 5 g. of hemihydrate are sieved on a 32 micron sieve (425 mesh, U.S. Standard Sieve) for 2 minutes using the Alpine air-jet sieving device operating with full vacuum. The weight of particles retained on this sieve after a 2 minute sieving time divided by 5 and multiplied by 100 is the percent of particles by weight larger than 32 microns in the calcined gypsum hemihydrate.

The fineness test method used for determining the percent of particles by-weight smaller than 1 micron and between 6 microns and 16 microns is the Stokes' gravity sedimentation method, run as follows: 10 g. of calcined gypsum hemihydrate is stirred in 300 ml. of reagent grade isopropyl alcohol containing 0.5 g. of dissolved calcium chloride (antiflocculant) in a Waring Blendor for 5 seconds; the suspension is transferred quantitatively to a 1 liter Soil-Test cylinder and diluted to 1 liter with reagent grade isopropyl alcohol and placed in an isothermal bath. A well-designed hydrometer readable to the fourth decimal in density is used to obtain "weight percent finer" figures at consecutive longer elapsed times, and, therefore, at successively smaller Stokes' sizes.

It will be readily apparent from the foregoing that I have invented a process of great commercial importance, which will enable much lighter and much stronger gypsum plasterboard products and other gypsum castings to be made.

Besides producing increased strength, knowledge of the unique physical properties of the particles in calcined gypsum hemihydrate between 6 microns and 16 microns in size has enabled a large water reduction in slurry mixing, resulting in added economics in the operation.

Although only certain particular embodiment of this invention are shown above, many modifications therein may be made and it is thus contemplated to cover any such modifications as fall within the true spirit and scope of this invention.

I claim:

1. In a process of producing gypsum board having increased dry compressive strength at any particular dry density, and reduced ganging water demand, the process including the steps of calcining gypsum, mixing the calcined gypsum with water to form an aqueous slurry of the calcined gypsum, and casting the mixture between paper cover sheets; the improvement comprising, prior to said mixing step, the steps of size classifying the gypsum into a fine fraction containing essentially no particles larger than about 32 microns and a coarse fraction containing essentially all of the particles larger than about 32 microns, recovering the fine fraction, and using the same in making the slurry.

2. The improved process as defined in claim 1, wherein said size classifying step is done prior to said calcining.

3. The improved process as defined in claim 1, wherein said size classifying step is done after said calcining step but prior to said mixing step.

References Cited

UNITED STATES PATENTS

| | | | |
|---|---|---|---|
| 2,088,813 | 8/1937 | Roos | 156—346 X |
| 2,366,673 | 1/1945 | Paley | 156—346 X |
| 3,343,818 | 9/1967 | Plemons et al. | 156—346 X |
| 3,459,620 | 8/1969 | McCleary et al. | 156—346 |

CARL D. QUARFORTH, Primary Examiner

S. J. LECHERT Jr., Assistant Examiner

U.S. Cl. X.R.

156—242, 276, 300; 161—270; 106—110

UNITED STATES PATENT OFFICE
CERTIFICATE OF CORRECTION

Patent No. 3,666,581                    Dated May 30, 1972

Inventor(s)  Marvin K. Lane

It is certified that error appears in the above-identified patent and that said Letters Patent are hereby corrected as shown below:

Column 1, line 36, "lith" should read -- lath --.

Column 1, line 38, "recks" should read -- decks --.

Column 4, line 54, "slurrf" should read -- slurry --.

Column 4, line 60, "miring" should read -- mixing --.

Column 7, in Table 5, the first row thereof, "kettle calcined gypsum ... that contains about 35a/c" should read -- kettle calcined gypsum ... that contains about 35% --.

Column 10, line 5 (line 3 of Claim 1), "ganging" should read -- gauging --.

Signed and sealed this 31st day of October 1972.

(SEAL)
Attest:

EDWARD M. FLETCHER, JR.                ROBERT GOTTSCHALK
Attesting Officer                       Commissioner of Patents